United States Patent
Chen et al.

(10) Patent No.: US 9,514,411 B2
(45) Date of Patent: *Dec. 6, 2016

(54) COMPUTER-BASED EXTRACTION OF COMPLEX BUILDING OPERATION RULES FOR PRODUCTS AND SERVICES

(71) Applicant: International Business Machines Corporation, Armonk, NY (US)

(72) Inventors: Bei Chen, Dublin (IE); Joern Ploennigs, Dublin (IE); Anika Schumann, Dublin (IE); Mathieu Sinn, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 408 days.

This patent is subject to a terminal disclaimer.

(21) Appl. No.: 14/107,896

(22) Filed: Dec. 16, 2013

(65) Prior Publication Data

US 2015/0134586 A1    May 14, 2015

Related U.S. Application Data (63) Continuation of application No. 14/079,157, filed on Nov. 13, 2013.

(51) Int. Cl.
*G06N 5/02* (2006.01)
*G05B 15/02* (2006.01)

(52) U.S. Cl.
CPC .............. *G06N 5/025* (2013.01); *G05B 15/02* (2013.01); *G05B 2219/2642* (2013.01)

(58) Field of Classification Search
None
See application file for complete search history.

(56) References Cited

U.S. PATENT DOCUMENTS

| | | | |
|---|---|---|---|
| 8,090,256 B2 | 1/2012 | Reisslein et al. | |
| 2005/0171645 A1* | 8/2005 | Oswald | G05B 15/02 700/276 |
| 2009/0018798 A1 | 1/2009 | Dorneich et al. | |
| 2011/0047418 A1 | 2/2011 | Drees et al. | |
| 2012/0198246 A1 | 8/2012 | German et al. | |
| 2012/0203970 A1 | 8/2012 | Biran et al. | |
| 2012/0232701 A1 | 9/2012 | Carty et al. | |

(Continued)

FOREIGN PATENT DOCUMENTS

WO    2012068488 A2    5/2012

OTHER PUBLICATIONS

Ploennigs et al., BASont—A modular, adaptive building automation system ontology, IEEE IECON, pp. 4827-4833, 2012.*

(Continued)

*Primary Examiner* — Kakali Chaki
*Assistant Examiner* — Michael Zidanic
(74) *Attorney, Agent, or Firm* — Cantor Colburn LLP; Kurt Goudy (57) ABSTRACT

A method for generating an operational rule associated with a building management system includes identifying, with a processing device, a first pattern associated with a series of operational observations corresponding to a property of the building management system, correlating a first contextual attribute with the first pattern, and deriving the operational rule at least in part based on the first pattern and the first contextual attribute.

12 Claims, 4 Drawing Sheets

(56) References Cited

U.S. PATENT DOCUMENTS

| | | |
|---|---|---|
| 2013/0085616 A1 | 4/2013 | Wenzel |
| 2013/0173062 A1 | 7/2013 | Koenig-Richardson |
| 2013/0173064 A1* | 7/2013 | Fadell ................ G05D 23/1902 |
| | | 700/276 |

OTHER PUBLICATIONS

Rabee M. Reffat et al., "Using data mining on building maintenance during the building life cycle", School of Architecture, University of of Tasmania, Tasmani, Australia, pp. 91-97, 2004.
Jinsoo Han et al., "Efficient Building Energy Management System Based on Ontology, Inference Rules, and Simulation", International Conference on Intelligent Building and Management, Proc .of CSIT vol. 5, Singapore, pp. 295-299, 2011.

* cited by examiner

COMPUTER-BASED EXTRACTION OF COMPLEX BUILDING OPERATION RULES FOR PRODUCTS AND SERVICES

CROSS-REFERENCE TO RELATED APPLICATIONS

The present application is a Continuation of U.S. patent application Ser. No. 14/079,157, entitled "COMPUTER-BASED EXTRACTION OF COMPLEX OPERATION RULES FOR PRODUCTS AND SERVICES", filed on Nov. 13, 2013, which is incorporated herein by reference in its entirety.

BACKGROUND

The present invention relates generally to automated building management, and more specifically, to the automatic extraction of context-based building operation rules.

A building management system (BMS) generally may include a computer-based system that monitors and controls building mechanical and electrical equipment, such as heating, ventilation and air-conditioning (HVAC), cooling, lighting, shading, security or other asset classes. Building management systems are available that implement context-driven decision and control approaches applying manually defined rules. Analytic tools are available to evaluate building energy consumption. Diagnostic tools are available to troubleshoot anomalies with building mechanical and electrical components.

Data mining tools have been used to extract building operations patterns, including seasonality. Some existing building management systems implement manual processes to analyze building operational data and derive component operation rules, and automatically adjust threshold values of some rules, in an attempt to optimize operation.

SUMMARY

According to one embodiment of the present invention, a method for generating an operational rule associated with a building management system includes identifying, with a processing device, a first pattern associated with a series of operational observations corresponding to a property of the building management system, correlating a first contextual attribute with the first pattern, and deriving the operational rule at least in part based on the first pattern and the first contextual attribute.

According to another embodiment of the present invention, a system for generating an operational rule associated with a building management system includes a pattern extractor configured to identify a first pattern associated with a series of operational observations corresponding to a property of the building management system, a context correlator configured to correlate a first contextual attribute with the first pattern, and a rule deriver configured to derive the operational rule at least in part based on the first pattern and the first contextual attribute.

According to yet another embodiment of the present invention, a computer program product for generating an operational rule associated with a building management system, the computer program product including a computer readable storage medium having program code embodied therewith, the program code executable by a computer to implement identifying a first pattern associated with a series of operational observations corresponding to a property of the building management system, correlating a first contextual attribute with the first pattern, and deriving the operational rule at least in part based on the first pattern and the first contextual attribute.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

An embodiment in accordance with the present invention may provide a method for creating a set of building operation rules. The method may include obtaining a plurality of data points, for example, corresponding to sensor and actuator values observed over time, and semantically annotating the data points. The method further may include identifying patterns among the data points and annotating the patterns, for example, using contextual attributes selected from a knowledge base. In addition, the method may include generating operational rules by correlating one or more applicable contextual attributes to each pattern.

Some contemporary solutions do not correlate context to patterns in an automated manner. In addition, some contemporary solutions do not extract building operation rules in an automated manner.

An embodiment of the present invention may automatically process discrete or continuous data to identify time-series patterns in building operations. Further, an embodiment may automatically correlate context to operational patterns, and automatically extract complex, context-sensitive building operation rules.

An embodiment may provide a combined description of time series features, semantic contexts and operational constraints for a building management system. An embodiment may characterize building operational patterns in terms of temporal, spatial or semantic contexts. Hence, an embodiment may be used to analyze and optimize building controls, as well as to detect and diagnose system or component faults. An embodiment may automatically assess building operation routines with significantly reduced integration costs compared to contemporary solutions, due to high degree of human intervention required for contemporary solutions.

In addition, an embodiment may enable the automatic identification of abnormal or inefficient operation of buildings. For example, if a fault occurs in a building HVAC system, an embodiment may generate early warning, which may lead to significant energy savings.

An embodiment may capture generic domain knowledge regarding potential building operation context, for example, in an entity relationship knowledge base, and exploit this knowledge to improve detection of building operational patterns. An embodiment may semantically annotate building operation patterns and extract building operation rules from the semantically annotated patterns.

Figure 1:
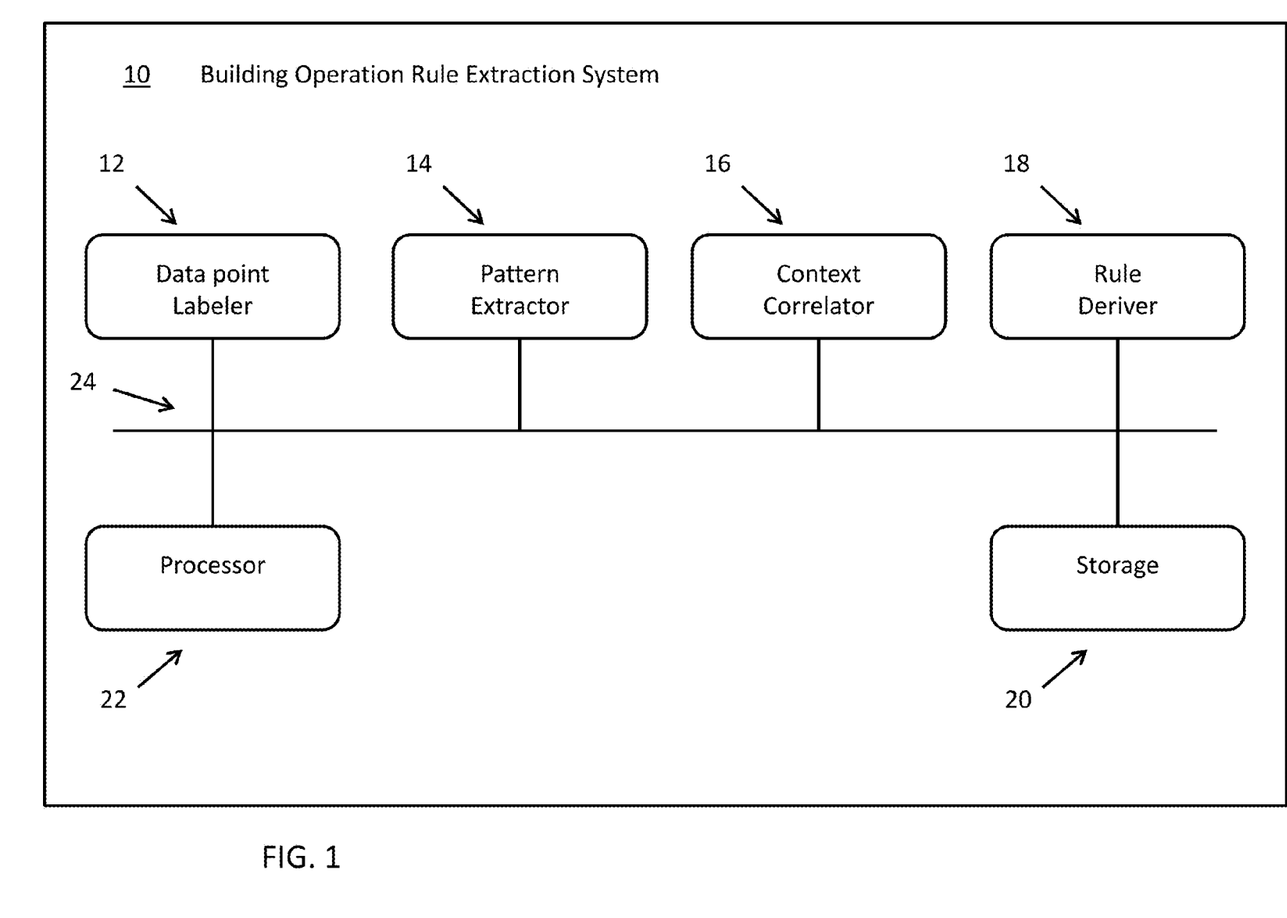
FIG. 1 is a schematic diagram of a building operation rule extraction system in accordance with an embodiment of the invention.

With reference now to FIG. 1, a building operation rule extraction system 10 in accordance with the present invention may include a data point labeler 12, an pattern extractor 14, a context correlator 16, a rule deriver 18, storage 20, and a processor 22. The various components of the building operation rule extraction system 10 may be communicatively connected by way of data links 24.

The data links 24 may include any connective medium capable of transmitting digital data, as the specific application may require. For example, in any embodiment, the data links 24 may be implemented using any type of combination of known communications connections, including but not limited to digital data buses, a universal serial bus (USB), an Ethernet bus or cable, a wireless access point, twisted pairs of wires, or the like. In any embodiment, any portion or all of the data links 24 may be implemented using physical connections, radio frequency or wireless technology. A person of ordinary skill in the art will readily apprehend that any combination of numerous existing or future data communication technologies may be implemented in association with an embodiment of the invention.

The building operation rule extraction system 10 may be configured to receive a large set of data points, such as operational observations, or measurements, regarding properties of a building management system. For example, the data points may include time-series measurements of building operation performance parameters, or properties, such as sensors, actuators, setpoints, or the like. The data points may include historical observations or real-time observations. The data point labeler 12 may be configured to analyze the data points and add semantic labels to the data points, for example, based on contextual classifications regarding the properties.

The pattern extractor 14 may be configured to further analyze the data points, for example, implementing data mining and pattern extraction methods, in order to identify common patterns among the data points. The pattern extractor 14 may use the contextual classification information to select appropriate data mining approaches and parameters for pattern extraction.

The context correlator 16 may be configured to annotate the identified patterns with additional context information, such as contextual factors that can affect building operational parameters. For example, the context correlator 16 may perform statistical analysis in order to correlate potential contextual factors to the operational patterns.

The rule deriver 18 may be configured to create, or generate, operational rules for the building operation system. For example, the rule deriver 18 may add operational constraints to the correlated patterns and contexts to create building operational rules. Thus, the building operation rule extraction system 10 may automatically extract complex, context-sensitive building operation rules from building operation system operational data.

An embodiment may relate context information to identified operational patterns in order to improve the understanding of the relationship between various contextual factors and common operational patterns. In various embodiments, the generated rules may be used to analyze and report building operation patterns, parameterize and optimize building controls, and parameterize fault detection systems. An embodiment may optimize energy use based on actual current or historical building operations.

Figure 2:
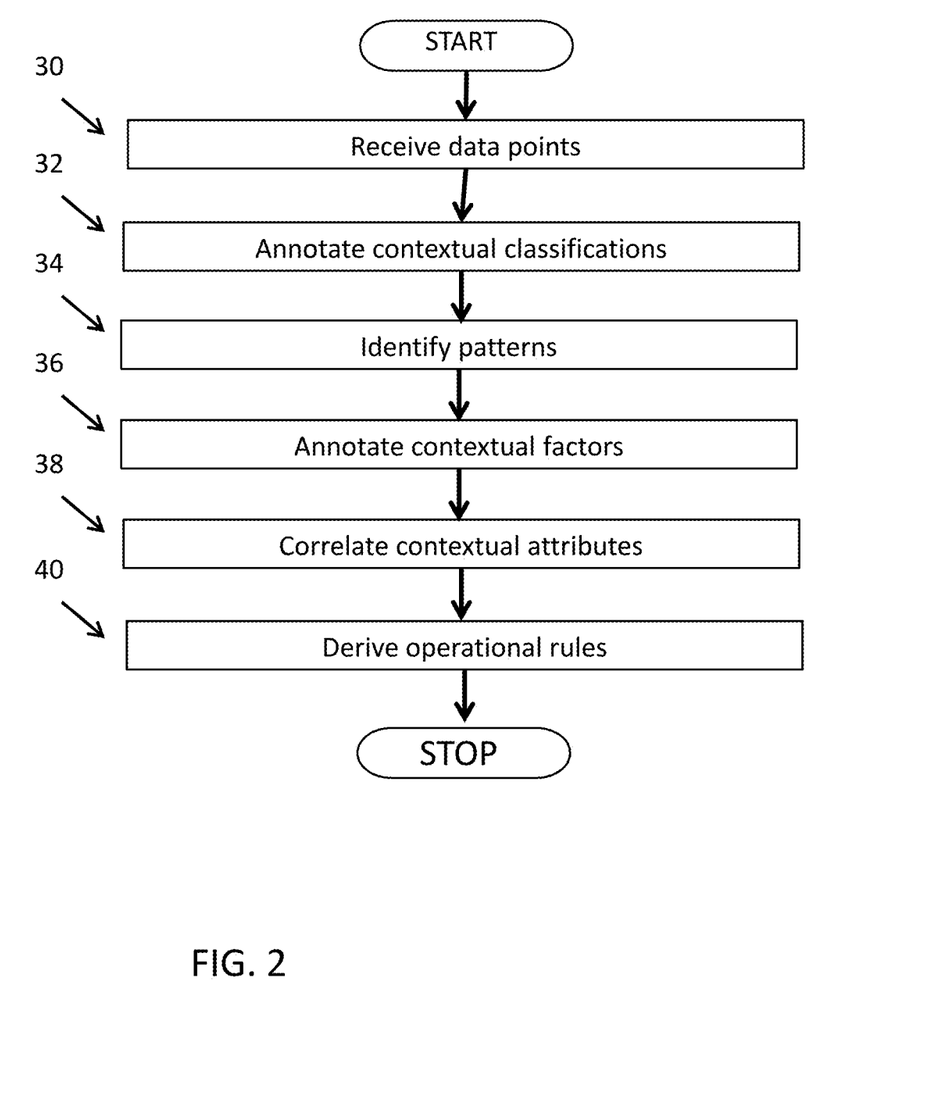
FIG. 2 is a flow diagram of a method for extracting building operational rules in accordance with an embodiment of the invention.

Referring to FIG. 2, a method in accordance with the present invention is generally shown. The method may be performed, for example, by the building operation rule extraction system 10 of FIG. 1. In block 30, a set of data points, or observations, may be received. For example, a building maintenance system may provide several hundred data points containing measurements for multiple rooms, each room having a temperature sensor, a heating system temperature setpoint and a meeting schedule.

In block 32, the data points may be automatically annotated, implementing techniques known in the art, with semantic labels based on contextual classifications of the associated building maintenance system properties represented by the operational observations. Exemplary contextual classifications include "temperature sensor" (semantic context), "temperature setpoint" (semantic context), "occupancy sensor" (semantic context), "meeting schedule" (functional context), and "meeting room" (spatial context), and the like. These labels provide context knowledge that is generic and static regarding each data point.

In block 34, common patterns may be identified in the time series, implementing data mining approaches known in the art. A person of ordinary skill in the art will recognize that pattern clustering or feature extraction methods may be used to reduce the number and complexity of patterns. Different patterns may be identified in association with different resolutions of the time series. For example, time series resolutions may represent distinct temporal segmentations, such as hours, days, weeks, months, or the like.

In an embodiment, patterns corresponding to different time series resolutions may be clustered hierarchically into different time segments. That is, week patterns may be formed as a series of day patterns, and day patterns may be formed as a series of hour patterns, and so on. This hierarchical modeling approach may simplify subsequent processes, because context may be propagated through the hierarchy.

Figure 3:
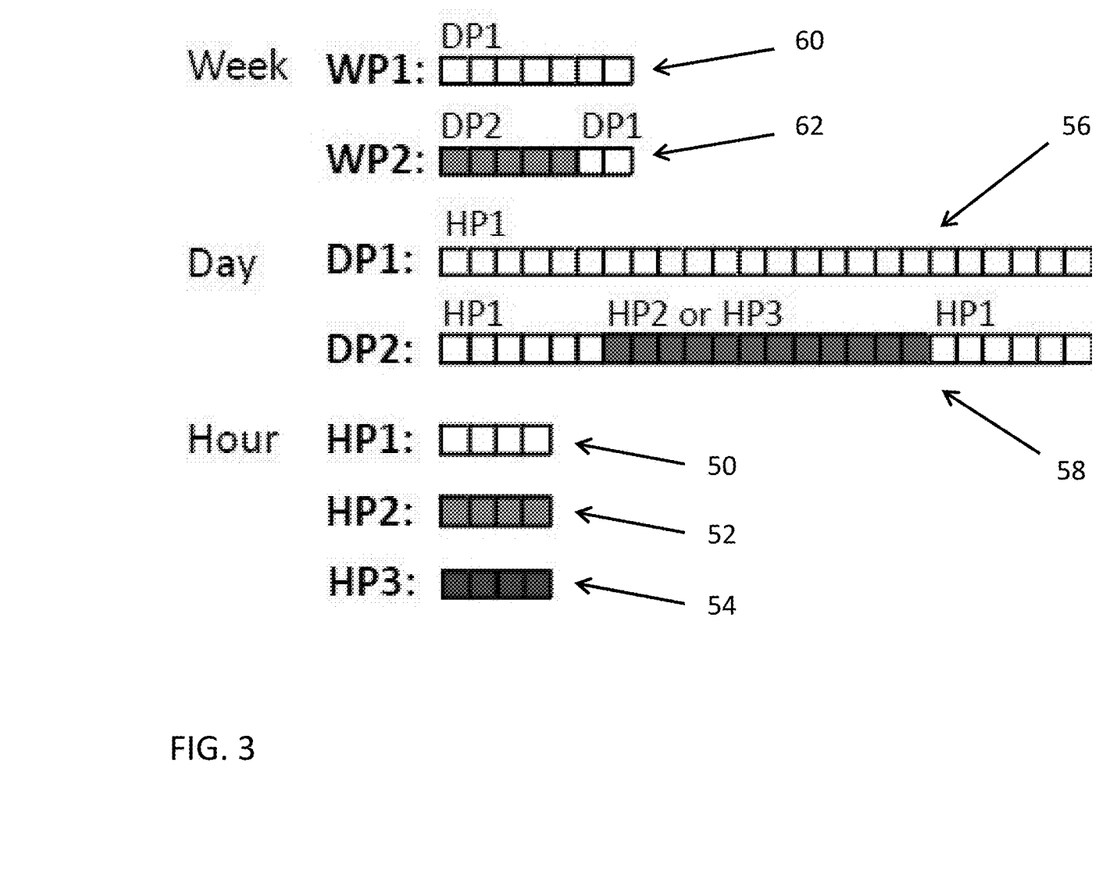
FIG. 3 is an illustration of patterns identified in a time series of data points in accordance with an embodiment of the invention.

As a specific example, FIG. 3 illustrates exemplary patterns, or features, identified in a hypothetical time series of a temperature setpoint. In this example, the data points of the setpoint time series may initially be analyzed in time segments, that is, with a resolution, of one hour using feature extraction techniques. Three exemplary hourly patterns 50, 52, 54 are identified from the time series. Each box of the hourly patterns 50, 52, 54 may represent one sample, or observation, period. In this example, the time-series has a sampling period of 15 minutes, and each of the four boxes in the hourly patterns 50, 52, 54 may represent a 15-minute sample period. Thus, each of the hourly patterns 50, 52, 54 represents a time period of one hour formed from four sample periods.

For example, three exemplary features may be created for these hourly patterns 50, 52, 54, such as HP1, HP2, and HP3, representing temperature setpoints of 60 F, 65 F, and 70 F, respectively. In FIG. 3, the shading of each box represents a setpoint temperature. For example, the shading of the pattern 50 may represent a setpoint of 60 F, the shading of pattern 52 may represent a setpoint of 65 F, and the shading of pattern 54 may represent a setpoint of 70 F.

Further, a hierarchy of patterns with increasing time resolution may be created. Thus, the time series may be further analyzed using a time segmentation, or resolution, of one day to extract day features. For example, the daily patterns 56, 58 may be created from a series of previously identified hourly features. Thus, each of the boxes in the daily patterns 56, 58 may represent an hourly pattern 50, 52, 54, such that each daily pattern 56, 58 represents a time period of 24 hours.

For example, two exemplary features may be created for these daily patterns 56, 58, such as DP1 and DP2. Thus, the daily pattern 56, solely composed of HP1 features, represents days during which the temperature setpoint remains at 60 F throughout the entire day. Similarly, the daily pattern 58 represents days on which the temperature setpoint initially is set to 60 F during a six-hour period, for example, beginning at midnight, after which the setpoint changes to either 65 F or 70 F during a twelve-hour period, and then reverts to 60 F during another six-hour period.

Analysis of the time series may be repeated, for example, using a time segmentation, or resolution, of one week to retrieve week features. For example, the weekly patterns 60, 62 may be created from a series of previously identified hourly features. Thus, each of the boxes in the weekly patterns 60, 62 may represent a daily pattern 56, 58, such that each weekly pattern 60, 62 represents a time period of seven days.

For example, two exemplary features may be created for these weekly patterns 60, 62, such as WP1 and WP2. Thus, the weekly pattern 60, solely composed of DP1 features, represents weeks during which the temperature setpoint remains at 60 F throughout the entire week. Similarly, the weekly pattern 62 represents weeks during which the daily pattern 58 is followed for five days, after which two days follow the daily pattern 56.

Data mining approaches may be highly sensitive to an adequate parameterization of the building management system properties. Thus, the contextual classification labels annotated in block 32 may be consulted to select optimized approaches and parameters for each property time series. For example, room temperature is a slowly oscillating continuous variable that can be optimally modeled implementing a frequency-space model. Alternatively, temperature setpoints are stepwise-changing, discrete variables that may be optimally modeled implementing a state-space model.

Thus, in an embodiment, a data mining approach may group together all data points that optimally implement the same model type and parameter type. For example, all room temperature setpoints may be modeled by the same state space model. Knowledge regarding optimal model and parameter types for various properties may be defined in a knowledge base, such as an entity relationship database configured in the storage 20 of FIG. 1.

In block 36, the patterns, or features, identified in block 34 may be automatically annotated, implementing techniques known in the art, with feature-specific context based on contextual factors that can affect building operational parameters. Exemplary contextual factors include "workday" (temporal context), "weekend" (temporal context), "holiday" (temporal context), time of day (temporal context), day of week, (temporal context), month (temporal context), season (temporal context), sensor location (spatial context), "occupied" (descriptive context), "free" (descriptive context) and "meeting" (functional context), "exhibition" (functional context), and the like. These contextual factors provide context knowledge that is situational and dynamic regarding the data points. Information about potential contexts may be stored in a knowledge base, such as an entity relationship database configured in the storage 20 of FIG. 1.

In block 38, statistical analysis may compute the correlation of each context to the identified patterns. For example, various situations may be characterized by combinations of contexts, which may be statistically modeled. The features may be evaluated for pattern occurrences corresponding to each combination of contexts that may be valid during a specific situation.

For example, a temperature setpoint generally may be correlated to temporal context, such as business hours are relevant. If the setpoint is driven by room occupancy, then the setpoint may further be correlated to a semantic context, such as an occupancy sensor, if available, or a meeting schedule.

Figure 4:
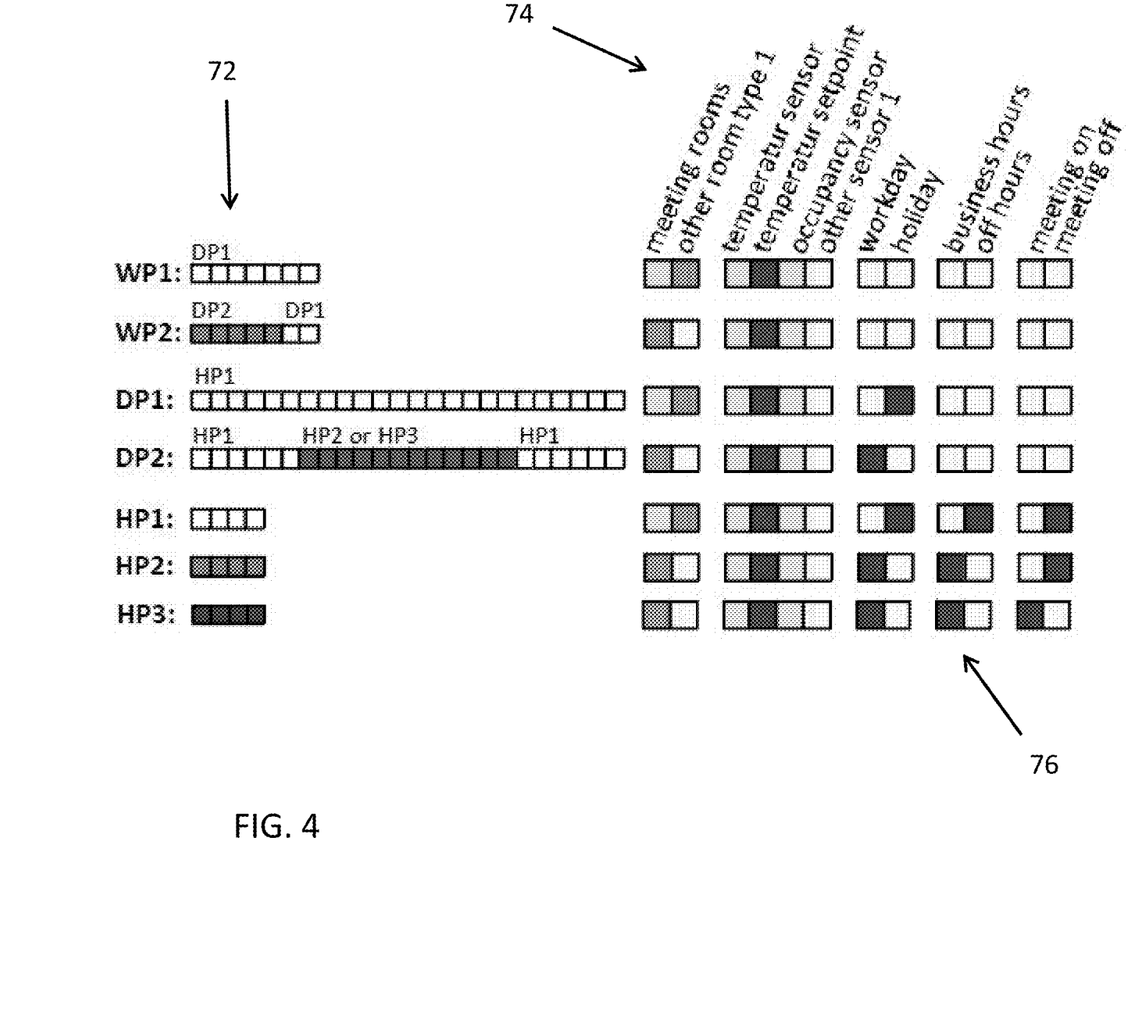
FIG. 4 is an illustration of contextual attributes correlated to the patterns of FIG. 3 in accordance with an embodiment of the invention.

As a specific example, FIG. 4 illustrates exemplary contextual attributes correlated to the patterns, or features, of FIG. 3. In this example, a mapping is shown between the identified patterns 72 various contextual attributes 74, including contextual classifications and contextual factors. The shading of the individual boxes 76 corresponding to each contextual attribute 74 and each pattern 72 may indicate the strength of the correlation between each contextual attribute 74 and each pattern 72.

For example, the exemplary feature HP3 shows a strong correlation with the temperature setpoint, workdays, business hours, and meetings. Similarly, the exemplary feature HP2 shows a strong correlation to the temperature setpoint, workdays, and, business hours, but not with meetings. Further, the exemplary feature HP1 shows a strong correlation with the temperature setpoint, holidays, non-business hours.

The situation corresponding to each pattern may be defined by clustering the correlated context information. Thus, each feature may be annotated with the correlated contextual attributes to define the corresponding situation and collect statistics of the occurrence of each pattern. For example, based on the patterns 72 and contextual attributes 74, the following correlations may result:

DP1: temperature setpoint & meeting room & holiday,
DP2: temperature setpoint & meeting room & workday,
HP1: temperature setpoint & meeting room & meeting off & off-hour,
HP2: temperature setpoint & meeting room & meeting off & business hour,
HP3: temperature setpoint & meeting room & meeting on & business hour.

In block 40, statistical analysis may be performed on the identified patterns and context information, combined with information stored in a knowledge base, such as an entity relationship database configured in the storage 20 of FIG. 1, to derive operational rules, such as complex building operation rules. The operational rules may be derived by combining one or more patterns with the correlated context and applicable application constraints, such as logical operators and commands. In an embodiment, exemplary constraints may include "IF," "AND," "OR," "IS LOWER THAN," "IS GREATER THAN," "EQUALS," "FOR LONGER THAN," "SET," "RAISE ALARM," "IN," and the like.

For example, the following control rule may be derived from the patterns 72 and correlated context information 74 of FIG. 4:

SET temperature setpoint IN meeting room ((TO 70 F IF meeting on AND business hour) AND (TO 65 F IF meeting off AND business hour) AND (TO 60 F ON off-hour))

The rule includes time series features (numbers), contextual attributes (lower case), and operational constraints (uppercase).

This exemplary control rule increases the temperature setpoint in meeting rooms to 70 F if the room is booked for a meeting, decreases the setpoint to a standby temperature of 65 F during business hours, and reduces the setpoint to 60 F during non-business hours. The control rule was derived based on the hourly features HP1, HP2 and HP3 of FIG. 3, the correlated contextual attributes shown in FIG. 4, and additional information stored in a knowledge base. For example, the stored knowledge base may indicate that a control rule may be created for each property time series annotated "setpoint."

Implementing logical reasoning analytical techniques additional rules may be derived, for example, to detect an operational anomaly. For example, recognizing that the room includes a temperature sensor, a quality monitoring rule may be derived based on the daily features, DP1 and DP2, of FIG. 3, the correlated contextual attributes shown in FIG. 4, and additional information stored in the knowledge base. For example, the stored knowledge base may indicate that temperature setpoint alert rules may be created by adding temperature tolerances of 2 F and delay tolerances of 15 minutes. Thus, the following rule may be derived:

RAISE ALARM IF temperature sensor IN meeting room (IS LOWER 68 F IF meeting on AND business hour FOR MORE THAN 15 minutes) OR (IS LOWER 63 F AND business hour FOR MORE THAN 15 minutes) OR (IS LOWER 58 F FOR MORE THAN 15 minutes)

This quality monitoring rule, or fault detection rule, may detect an operational anomaly and raise an alert if room temperature drops below 68 F for more than 15 minutes while a meeting is scheduled, below 63 F during other business hours, or below 58 F for more than 15 minutes during non-business hours.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for generating an operational rule associated with a building management system, comprising:
    identifying, with a processing device, a first pattern associated with a series of operational observations corresponding to a property of the building management system, and identifying a second pattern associated with the series of operational observations;
    correlating a first contextual attribute with the first pattern, and correlating a second contextual attribute with the second pattern, wherein the first pattern is based on a first resolution and the second pattern is based on a second resolution; and
    deriving the operational rule at least in part based on the first pattern and the first contextual attribute, and the second pattern and the second contextual attribute.

2. The method of claim 1, wherein the series includes a plurality of operational observations taken over a period of time.

3. The method of claim 1, further comprising receiving a plurality of historical operational observations including the series.

4. The method of claim 1, further comprising receiving a plurality of real-time operational observations including the series.

5. The method of claim 1, wherein the property is a temperature setpoint.

6. The method of claim 1, wherein the first contextual attribute is selected from a plurality of predetermined contextual attributes in a knowledge base.

7. The method of claim 1, wherein the first contextual attribute is one selected from the following: a temporal context, a spatial context, a functional context, a descriptive context and a semantic context.

8. The method of claim 1, further comprising associating a contextual classification with the property, wherein the first contextual attribute comprises the contextual classification.

9. The method of claim 1, wherein the first contextual attribute comprises a contextual factor.

10. The method of claim 9, further comprising:
    associating a contextual classification with the property; and
    correlating the contextual classification with the first pattern, wherein the operational rule further is derived at least in part based on the contextual classification.

11. The method of claim 1, wherein deriving the operational rule further comprises applying a constraint to the first pattern or to the first contextual attribute.

12. The method of claim 11, wherein deriving the operational rule further comprises:
    applying a tolerance to the first pattern; and
    detecting an operational anomaly based on the first pattern and the tolerance.

* * * * *